(12) United States Patent
Gambhir et al.

(10) Patent No.: US 9,612,715 B2
(45) Date of Patent: Apr. 4, 2017

(54) REAL-TIME PREVIEW OF UNIFORM RESOURCE IDENTIFIER ADDRESSABLE DYNAMIC CONTENT

(75) Inventors: Kapil Gambhir, New Delhi (IN); Jaspreet Singh, Delhi (IN); Jatin K. Varshney, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 921 days.

(21) Appl. No.: 12/824,970

(22) Filed: Jun. 28, 2010

(65) Prior Publication Data

US 2011/0320964 A1    Dec. 29, 2011

(51) Int. Cl.
*G06F 3/048* (2013.01)
*G06F 3/0481* (2013.01)
*G06F 17/30* (2006.01)

(52) U.S. Cl.
CPC ........ *G06F 3/04817* (2013.01); *G06F 3/0481* (2013.01); *G06F 17/30893* (2013.01)

(58) Field of Classification Search
CPC ...................... G06F 17/30893; G06F 3/04817
USPC .......................... 715/274, 756; 345/660, 663
See application file for complete search history.

(56) References Cited

U.S. PATENT DOCUMENTS

| | | | |
|---|---|---|---|
| 5,903,905 | A | 5/1999 | Andersen et al. |
| 6,693,652 | B1 | 2/2004 | Barrus et al. |
| 7,031,968 | B2 | 4/2006 | Kremer et al. |
| 7,178,101 | B2 * | 2/2007 | Tunning ............. G06F 17/2247 707/E17.006 |
| 7,251,775 | B1 | 7/2007 | Astala et al. |
| 7,673,255 | B2 * | 3/2010 | Schechter ............. G06F 9/4443 715/783 |
| 8,041,701 | B2 * | 10/2011 | Amato ............. G06F 17/30864 707/707 |
| 8,375,208 | B2 * | 2/2013 | Darapu ............ H04N 21/25816 709/250 |
| 2002/0129114 | A1 | 9/2002 | Sundaresan et al. |
| 2004/0205633 | A1 * | 10/2004 | Martinez ........... G06F 17/30899 715/274 |

(Continued)

FOREIGN PATENT DOCUMENTS

EP    1168204 A3    8/2004

OTHER PUBLICATIONS

StackOverflow.com "How to create url preview in JavaScript", Jun. 17, 2010, pp. 1-3 http://stackoverflow.com/questions/2715752/how-to-create-url-preview-in-javascript.*

(Continued)

*Primary Examiner* — Scott Baderman
*Assistant Examiner* — Mario M Velez-Lopez
(74) *Attorney, Agent, or Firm* — Patents on Demand P.A.; Brian K. Buchheit; Scott M. Garrett

(57) ABSTRACT

The disclosure identifies a dynamic content associated with a content provider that can be a portion of markup content which automatically changes over time and can be user-interactive. The dynamic content can be a uniform resource identifier (URI) addressable content. The dynamic content can be received from the content provider. A preview of the dynamic content can be presented in real-time within a markup renderable canvas of an interface. The preview can be uniformly scaled and the dynamic content within the preview can be non-interactive and can be unmodified by the receiving and presenting.

20 Claims, 3 Drawing Sheets

(56) References Cited

U.S. PATENT DOCUMENTS

| | | | |
|---|---|---|---|
| 2005/0216850 A1 | 9/2005 | Ramos et al. | |
| 2006/0107234 A1* | 5/2006 | Tudor | G06F 3/0481 715/821 |
| 2006/0230055 A1 | 10/2006 | Marcjan et al. | |
| 2006/0265417 A1* | 11/2006 | Amato | G06F 17/30864 |
| 2007/0130002 A1* | 6/2007 | Moran | G06Q 30/02 705/14.54 |
| 2008/0120569 A1 | 5/2008 | Mann et al. | |
| 2008/0235594 A1* | 9/2008 | Bhumkar | G06F 17/30991 715/738 |
| 2008/0281794 A1* | 11/2008 | Mathur | G06F 17/3089 |
| 2009/0100367 A1* | 4/2009 | Dargahi | G06Q 10/00 715/769 |
| 2009/0113301 A1* | 4/2009 | Fisher | G06F 8/61 715/716 |
| 2009/0222536 A1* | 9/2009 | Junghuber | G06F 17/3089 709/219 |
| 2010/0082411 A1* | 4/2010 | Goyal | G06Q 30/0241 705/14.4 |
| 2010/0107115 A1* | 4/2010 | Sareen | G06F 3/0481 715/783 |
| 2010/0131455 A1* | 5/2010 | Logan | G06F 17/30905 707/602 |
| 2010/0146012 A1* | 6/2010 | Beaudreau | G06F 17/30648 707/803 |
| 2010/0153486 A1* | 6/2010 | Stich | G06F 17/3089 709/203 |
| 2010/0205547 A1* | 8/2010 | Boegelund | G06F 3/0482 715/760 |
| 2010/0211865 A1* | 8/2010 | Fanning | G06F 17/30905 715/234 |
| 2010/0211893 A1* | 8/2010 | Fanning | G06F 17/3089 715/760 |
| 2010/0313159 A1* | 12/2010 | Decker | G06F 17/30899 715/772 |
| 2011/0016000 A1* | 1/2011 | Cronshaw | G06F 17/30905 705/14.55 |
| 2011/0022643 A1* | 1/2011 | Jalon | G06F 21/53 707/805 |
| 2013/0124342 A1* | 5/2013 | Virkar | G06Q 30/0241 705/14.73 |
| 2014/0330694 A1* | 11/2014 | Barker | G06Q 40/04 705/37 |
| 2015/0149935 A1* | 5/2015 | McNee | G06F 17/3089 715/760 |

OTHER PUBLICATIONS

Dynamicdrive.com, "Read-only Div Block", Jun. 4, 2007, pp. 1-3 http://www.dynamicdrive.com/forums/showthread.php?21399-Read-Only-Div-Block.*

Coolpreviews.com, Feb. 7, 2010, pp. 1-2 http://www.coolpreviews.com/.*

Adobe BrowserLab, Dec. 30, 2009, pp. 1-2 http://googlesystem.blogspot.com/2009/06/test-your-site-in-different-browsers.html.*

Wikipedia.org, "Web 2.0", Mar. 27, 2010, pp. 1-9 http://en.wikipedia.org/wiki/Web_2.0.* graphicconnectionkc.com, "CSS advantages", Jan. 31, 2010 , pp. 1-3 http://www.graphicconnectionkc.com/css-advantages.html.*

DevX.com "Display Tooltips on Your Hyperlinks" May 20, 1999, pp. 1-2 http://www.devx.com/tips/Tip/12981.*

Opera Software, "Content Blocking", Feb 5, 2009, pp. 1-2 http://help.opera.com/Windows/9.00/en/contentblock.html.*

Basic HTML: Manipulating Images, Jan. 1, 2007, pp. 1-4 http://www.htmlgoodies.com/primers/html/article.php/3478191.*

StackOverflow.com "How to create url preview in JavaScript", Jun. 17, 2010, pp. 1-4 http://stackoverflow.com/questions/2715752/how-to-create-u rl-preview-in-javascript.*

"Take Screenshots of Entire Web Pages In One Click With the Page Capture Widget," [online] Apaulodesign, 2009 [retrieved Jun. 21, 2010] retrieved from the Internet: <http://www.apaulodesign.com/widgets/page-capture.php>.

Ayers, E.Z., et al., "Using Graphic History in Browsing the World Wide Web," [online] Proceedings of the 4th International World Web Conference, 1995 [retrieved Jun. 21, 2010] retrieved from the Internet: <http://www.w3.org/Conferences/WWW4/Papers2/270/>.

Cockburn, A., et al., "WebView: A Graphical Aid for Revisiting Web Pages," [online] Proceedings of the OZCHI'99 Australian Conference on Human Computer Interaction, pp. 15-22, 1999, [retrieved Jun. 21, 2010] retrieved from the Internet: <http://citeseerx.ist.psu.edu/viewdoc/download?doi=10.1.1.46.6167&rep=rep1&type=pdf.>.

Helfman, J. I., "Mandala: An Architecture for Using Images to Access and Organize Web Information," [online] Lecture Notes in Computer Science, SpringerLink, vol. 1614, p. 657, 1999, [retrieved Jun. 21, 2010] retrieved from the Internet: <http://www.springerlink.com/content/e7xmfx5n16gtumqw>.

Hightower, R.R., et al., "Graphical WWW History, Graphical Multiscale Web Histories: A Study of PadPrints," [online] Proceedings of ACM Hypertext 98 Conference, [retrieved Jun. 21, 2010] retrieved from the Internet: <http://www.cs.umd.edu/hcil/pad++/papers/hypertext-98-padprints/>.

"Interclue makes your browsing smarter, faster, more informative," [online] Interclue, Ltd. 2006-2010, [retrieved Jun. 21, 2010] retrieved from the Internet: <http://interclue.com/>.

Roe, D., "A Quick Intro to Knowledge Tree SaaS Document," [online] CMS Wire, Simpler Media Group, Dec. 17, 2009 [retrieved Jun. 21, 2010] retrieved from the Internet: <http://www.cmswire.com/cms/document-management/a-quick-intro-to-knowledge-tree-saas-document-management-006289.php>.

Wynblatt, M., et al., "Web Page Caricatures: Multimedia Summaries for WWW Documents," [online] 1998 IEEE International Conference on Multimedia Computing and Systems (ICMCS'98) [retrieved Jun. 21, 2010] retrieved from the Internet: <http://www.computer.org/portal/web/csdl/abs/proceedings/icmcs/1998/8557/00/85570194a . . . >.

* cited by examiner

REAL-TIME PREVIEW OF UNIFORM RESOURCE IDENTIFIER ADDRESSABLE DYNAMIC CONTENT

BACKGROUND

The present invention relates to the field of content previewing and, more particularly, to real-time preview of uniform resource identifier addressable dynamic content.

A commonly used approach for creating thumbnail previews for Web-based content (e.g., Web pages) relies on many complex stages. The approach typically involves fetching the content, generating a preview image of the content, optionally compressing the image, storing the image to persistent store for future retrieval, and retrieving the content upon request. Sophisticated software components and/or solutions are required for each stage specified above. This complexity leads to significant computing resource overhead. Additionally, the preview can become outdated as content changes, a common occurrence with dynamically generated content. Usually, elaborate algorithms and arrangements are required to take care of this requirement of keeping the preview updated to reflect the latest changes of content. The preview (e.g., thumbnail) creation process also causes heavy load on the servers, which complicates with multiple clients trying to connect for obtaining the thumbnails.

One clear example where traditional previews fail to compensate for the dynamic nature of Web-based content is apparent in Rich Internet Applications which utilize dynamic technologies such as JavaScript, and MACROMEDIA FLASH. Typical examples of such content are Web 2.0 content and Software-as-a-Service (SaaS) type environments which can include widgets and portlets. Technologies utilized in these environments can add considerable complexities to the preview generation process. Since these technologies are dynamic which can constantly change during presentation and the preview generated is static (e.g., a snapshot in time), content which employ these technologies cannot be properly previewed. Most solutions make snapshot previews of topmost or indexed page only. While, useful for many scenarios, it assumes special significance of the content for which a preview is being generated. SaaS environments often require a preview for multiple states of pages/content which can sometimes be critical to decision-makers. As such, a new approach to account for the dynamic nature of Web-content is needed.

SUMMARY

The disclosure is a method, system, and interface for real-time preview of uniform resource identifier addressable dynamic content. A dynamic content associated with a content provider can be identified. The dynamic content can be a portion of markup content which automatically changes over time and can be user-interactive. The dynamic content can be a uniform resource identifier (URI) addressable content. The dynamic content can be received from the content provider. A preview of the dynamic content can be presented in real-time within a markup renderable canvas of an interface. The preview can be uniformly scaled and the dynamic content within the preview can be non-interactive and can be unmodified by the receiving and presenting step.

One aspect of the disclosure is a system, method, and interface for real-time preview of uniform resource identifier addressable dynamic content. The system can comprise a processor, a volatile memory, a bus connecting said processor, non-volatile memory, and volatile memory to each other that comprises computer usable program code execute-able by the processor, and computer usable program code. The computer usable program code comprising of a rendering engine and a preview of dynamic content.

Another aspect of the disclosure is an interface, method, and system for real-time preview of uniform resource identifier addressable dynamic content. The interface can comprise of an interface window for configuring a preview of a dynamic content within a markup renderable canvas of a browser. The preview can be presented in real-time within the canvas of a browser. The preview can comprise of markup identical to the markup of the dynamic content and the preview can be scaled by a factor of X. The markup elements within the preview can be unable to receive user input. The rendering engine can be configured to render a preview of a dynamic content associated with a content provider where the dynamic content is a portion of markup content which automatically changes over time and is user-interactive and the dynamic content is uniform resource identifier (URI) addressable content. The preview of dynamic content can be presented in real-time within a markup renderable canvas of a browser and the preview can comprise of markup identical to the markup of the dynamic content. The preview can be scaled by a factor of X and the markup elements within the preview can be unable to receive user input.

DETAILED DESCRIPTION

Figure 1:
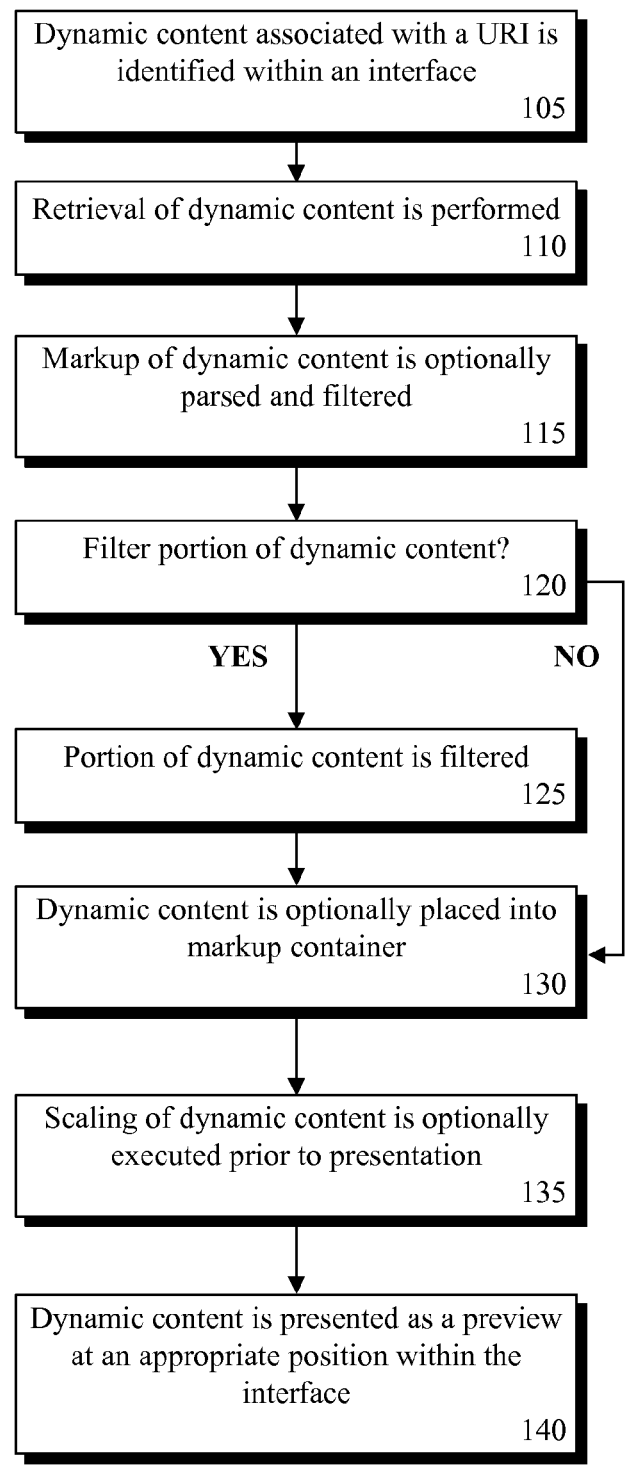
FIG. 1 is flowchart illustrating a method 100 for real-time preview of uniform resource identifier (URI) addressable dynamic content in accordance with an embodiment of inventive arrangements disclosed herein.

The present disclosure is a solution for real-time preview of uniform resource identifier addressable dynamic content. In the solution, a non-image preview of dynamic content can be generated in real-time. The preview can comprise of the dynamic content which has been scaled down and rendered within an interface (e.g., Web browser). That is, the preview is markup content identical or similar to the dynamic content. The preview can be non-interactive enabling dynamic content being previewed to be "read-only". In one instance, the preview can be presented inline with other content (e.g., proximate to a hyperlink) in response to a mouseover event.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is flowchart illustrating a method 100 for real-time preview of uniform resource identifier (URI) addressable dynamic content in accordance with an embodiment of inventive arrangements disclosed herein. In method 100, a real-time preview of dynamic content can be presented within an interface. The preview can be a non-image non-interactive rendition of dynamic content. That is, the preview can be an identical rendition of the dynamic content rendered in a scaled down "thumbnail" format. The preview can comprise of the markup of dynamic content which can be "de-activated" to render the preview non-interactive, thus effectively presenting a "live" preview of the dynamic content. It should be appreciated that the disclosure offers significant advantages over traditional image based approaches to previewing dynamic content. One significant advantage is that the disclosure obviates the requirement for creating two different representations (e.g., the actual content and an image preview of the content) of the same dynamic content.

As used herein, URI can be a string of characters used to identify a resource (e.g., dynamic content). The resource can be a local and/or remote resource communicatively linked via a bus and/or a network (e.g., Internet). URI can include, but is not limited to, Uniform Resource Identifier, Uniform Resource Locator (URL), and the like. For example, URI can be a Hypertext Transport Protocol (HTTP) URL of a dynamically generated Web page (e.g., http://www.dynamic-content.com/newcontent.php). In one instance, URI can be a file path associated with a file system. For instance, URI can specify a file resource within a local computing environment.

Dynamic content can be associated with a URI for which dynamic content can be accessed. Dynamic content include, but is not limited to, content which can be customized for each individual viewing (e.g., HTTP request), generated in real-time, automatically updates during presentation, responsive to user interaction, and the like. For example, dynamic content can be a political news Web page which is generated in real-time for each unique user request. In one instance, dynamic content can be content lacking a complete document object model (DOM) structure. In the instance, dynamic content can include Hypertext Markup Language (HTML) fragments including, but not limited to, portlets, widgets, and the like. That is, dynamic content can lack HTML elements such as <HTML>, <HEAD>, etc.

Dynamic content can include client-side and/or server-side technologies including, but not limited to, JAVA, MACROMEDIA FLASH, JAVASCRIPT, Dynamic Hypertext Markup Language (DHTML), Practical Extraction and Report Language (PERL), PHP Hypertext Parser (PHP), JAVA Server Pages (JSP), and the like. These technologies permit content to be non-static and in some instances, responsive to user interaction.

In step 105, dynamic content associated with a uniform resource identifier can be identified within an interface. Identification of dynamic content can include user selection, programmatic selection, and the like. For example, a user can click on a hyperlink to present the preview of dynamic content. Programmatic selection can include automatically selecting a collection of dynamic content to be previewed. For instance, a preview index can be generated for dynamic content in a similar way traditional image preview galleries are generated. In step 110, retrieval of dynamic content can be performed. Retrieval can include utilization of one or more network protocols (e.g., File Transfer Protocol), Web-based protocols, secure channel protocols, and the like. For example, retrieval can be performed by a HTTP request associated with a Web browser.

In step 115, markup of dynamic content can be optionally parsed and filtered for purposes of content locking and/or security. Parsing and/or filtering can be performed by a browser rendering engine, specialized plug-in, Web service, and the like. In one embodiment, filtering can be controlled via configuration settings associated with the interface. In another embodiment, filtering can be controlled by server-side settings. Filtering can permit one or more portions of dynamic content to be removed, modified, and/or suppressed prior to presentation of the preview of the dynamic content. Filtering can be utilized when content providers employ a tiered content access infrastructure. For instance, publication sites which offer free trial to users and paid subscription services.

In step 120, if a portion of dynamic content requires filtering, the method can continue to step 125, else proceed to step 130. In step 125, the portion of dynamic content requiring filtering can be filtered. Filtering can be performed utilizing pattern matching techniques such as regular expressions. For example, when dynamic content comprises of XML and requires extensive filtering, XML Path Language (XPATH) can be employed to programmatically filter content.

In step 130, dynamic content can be optionally placed into a markup container. In one instance, the markup container can be a <DIV> tag of a hypertext markup language (HTML) markup. In this way, the markup container can permit extensible manipulation of dynamic content in a traditional manner (e.g., Cascading Style Sheets).

In step 135, scaling of dynamic content can be optionally executed prior to presentation. Scaling can be performed using one or more scaling factors for determining appropriate presentation. Scaling can be affected by user established settings, client-side settings, server-side settings, and the like. In one instance, scaling can be automatically performed based on the resolution of a hardware screen associated with an interface. For example, a previously determined scaling factor (e.g., hardware resolution) can be utilized to appropriately scale the dynamic content for previewing. In step 140, dynamic content can be presented as a preview at an appropriate position within the interface.

Drawings presented herein are for illustrative purposes only and should not be construed to limit the invention in any regard. It should be appreciated, method 100 can be implemented utilizing any dynamic content comprising of markup language including, but not limited to, Extensible Markup Language (XML), Extensible HTML (XHTML), and the like.

Figure 2:
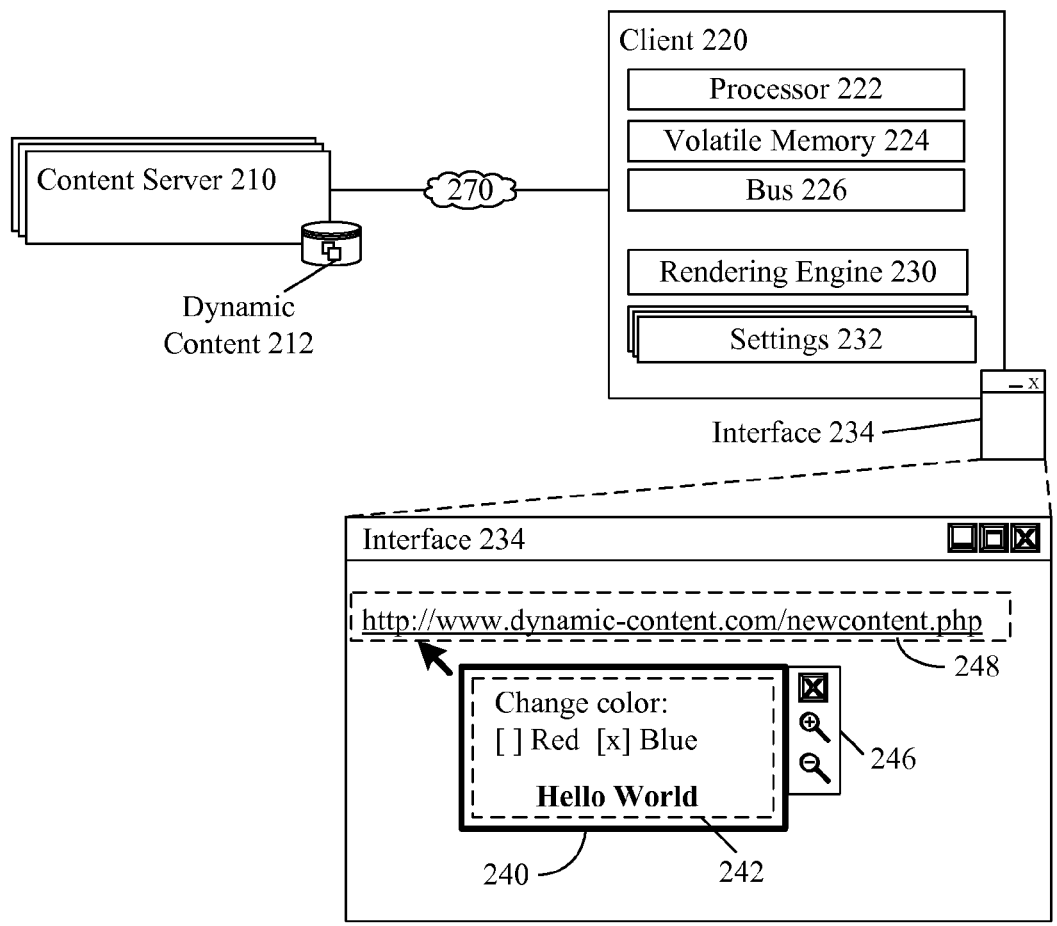
FIG. 2 is a schematic diagram illustrating a system 200 for real-time preview of uniform resource identifier (URI) addressable dynamic content in accordance with an embodiment of inventive arrangements disclosed herein.

FIG. 2 is a schematic diagram illustrating a system 200 for real-time preview of uniform resource identifier (URI) addressable dynamic content in accordance with an embodiment of inventive arrangements disclosed herein. System 200 can be present within the context of method 100. In system 200, a client 220 can utilize rendering engine 230 to present real-time preview 240 of dynamic content 212. That is, real-time preview 240 enables a "live view" of a resource without requiring navigation to the resource. Since the real-time preview 240 leverages existing markup of dynamic content 212, preview 240 can present previews which do not suffer from traditional image based limitations including blurriness and loss of data.

Dynamic content 212 can be associated with one or more content servers 210. Content servers can include, but are not limited to, Web servers, dynamic content servers, and the like. Client 220 can be communicatively linked to content server 210 via network 270.

Client 220 can request dynamic content 212 in a traditional manner when an event triggering a preview to be presented occurs. In one instance, a uniform resource identifier (URI) 248 associated with dynamic content 212 can be presented within interface 234. In one configuration of the instance, when a user interaction with URI 248 occurs, preview 240 can be presented. In another configuration of the instance, preview 240 can be presented during rendering of content (e.g., URI 248) within interface 234. Content 212 can be rendered within interface 234 as real-time preview 240 comprising of preview content 242. Preview content 242 can be rendered as a non-interactive version of content 212.

In one instance, preview 240 can conform to a traditional thumbnail format aspect ratio. In another instance, preview 240 can conform to customized aspect ratios based on, content 212 format, user settings, and the like. For example, a user can manually resize the preview 240 which triggers scaling of content 242. In one configuration, preview 240 can be rendered in a visually distinctive manner (e.g., colored border). For instance, preview 240 can be rendered with a frame where preview content 242 can be presented, as shown in interface 234.

Preview 240 can utilize one or more traditional and/or proprietary technologies, including but not limited to, HTML, JAVA, JAVASCRIPT, MACROMEDIA FLASH, and the like.

In one instance, preview 240 can present multiple different dynamic content 212. For instance, preview 240 can present dynamic content from different parts of a single Web site. In another instance, preview 240 can present dynamic content 212 from multiple content servers 210. For example, preview 240 can include preview tabs which allow a user to preview content from many Web sites within preview 240.

In one embodiment, selection of preview 240 can trigger interface 234 to navigate to the dynamic content 212. For example, when a user clicks on preview 240, interface 234 can present dynamic content 212.

Client 220 can be associated with interface 234 which can be used to present preview 240. Client 220 can include, but is not limited to, processor 222, volatile memory 224, bus 226, rendering engine 230, settings 232, and the like. Client 220 can include, but is not limited to, desktop computer, laptop, mobile computing device, mobile phone, multimedia device, and the like. In one instance, interface 234 can be a Web browser. In another instance, interface 234 can be a content browsing interface associated with a Software-as-a-Service environment.

Rendering engine 230 can be a hardware/software component of an interface 234 able to present a real-time preview of dynamic content 212. For instance, engine 230 can be a component of processor 222. Engine 230 can render markup of dynamic content within a real-time preview based on one or more configuration parameters including, but not limited to, settings 232, content server settings (not shown), and the like. In one instance, engine 230 can be an hypertext markup language (HTML) rendering engine of a Web browser. It should be appreciated engine 230 can be utilized to provide a real-time preview for dynamic content permitting content is comprised of markup.

Settings 232 can be one or more configuration parameters for controlling the presentation and/or behavior of preview 240, preview content 242, and/or user controls 246. Settings 232 can include parameters for customizing preview appearance, presentation, dynamic content filtering, security settings, and the like. In one instance, settings 232 can be used to show/hide functionality associated with user controls 246. For example, on devices with limited screen area, user controls 246 can be configured to automatically hide until the preview 240 is selected. In one instance, settings 232 can permit preview 240 to directly receive user input without the use of user controls 246. For example, preview 240 can be configured to respond to multi-touch zoom gestures permitting content zooming of preview 240.

In one embodiment, settings 232 can be associated with dynamic content 212. For instance, settings 232 can be attribute values within markup elements of content 212. In one configuration of the embodiment, settings 232 can restrict user selection of one or more elements of preview content 242 enabling content locking to be achieved.

User controls 246 can be one or more user interface elements permitting management of preview 240. User controls 246 can include, but is not limited to, functionality permitting zooming, scaling of preview, moving preview, and the like. In one embodiment, user controls 246 can be one or more graphical user interface elements permitting access of preview 240 functionality. In the embodiment, graphical icons can be presented associated with user controls 246 to enable user interaction. In one instance, user controls 246 can be presented juxtaposed to a outer edge of preview 240. In another instance, user controls 246 can be presented within the preview 240. For example, user controls 246 can be presented as a semi-transparent toolbar within preview 240.

In one instance, dynamic content 212 can be embedded within a container 250 as preview 240. In the instance, container 250 can be a <DIV> container of an HTML markup. In one configuration of the instance, the <DIV> contentEditable attribute can be set to "false" to enable non-interactivity to be established for the dynamic content 212. For example, applet code 242 which can normally receive user input can be rendered non-interactive utilizing container 250.

Drawings presented herein are for illustrative purposes only and should not be construed to limit the invention in any regard. In one instance, rendering engine 230 can be a plug-in component of a Web-browser. In another instance, customized containers for "trapping" content 212 within a preview 240 can be utilized.

Figure 3:
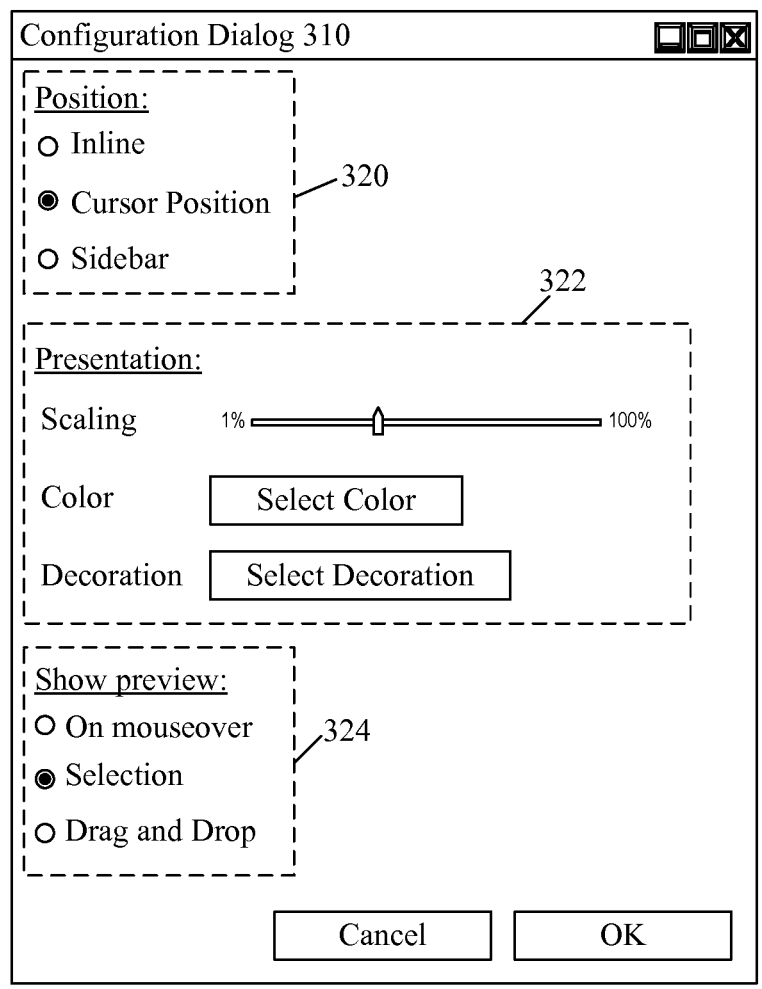
FIG. 3 is a schematic diagram illustrating a dialog 310 for real-time preview of uniform resource identifier (URI) addressable dynamic content in accordance with an embodiment of inventive arrangements disclosed herein.

FIG. 3 is a schematic diagram illustrating a dialog 310 for real-time preview of uniform resource identifier (URI) addressable dynamic content in accordance with an embodiment of inventive arrangements disclosed herein. Dialog 310 can be presented within the context of system 200. In dialog 310, settings 320-324 can configure a real-time preview of a dynamic content within an interface able to present dynamic content. For instance, dialog 310 can be a graphical user interface dialog presented within a Web-browser. In one instance, settings 320-324 can comprise of server-side settings, client-side settings, and the like. Settings 320-324 can include visual settings, behavioral settings, and the like.

Setting 320 can comprise of one or more user configurable elements for determining the presentation position of the real-time preview within the interface. Elements can permit preview to be presented inline, at a cursor position, and within a sidebar. Upon selection of the inline element of setting 320, the preview can be presented inline with content. In one instance, the preview can be presented proximate to a uniform resource locator (URI) associated with the dynamic content comprising the preview. For example, the preview can be presented next to a URL within a Web page. Selection of the cursor position element can allow previews to be presented at the cursor position within the interface. For instance, when a mouseover event occurs, the preview can be presented at the mouse cursor position. In instances where the interface supports a sidebar functionality, the preview can be configured to be presented with a sidebar utilizing sidebar element of setting 320.

Setting 322 can comprise one or more user configurable elements for establishing the visual appearance of the real-time preview within the interface. Elements can permit user customization including, but not limited to, scaling, color (e.g., border color), font, user customized decorations, and the like. Scaling element can permit the preview to be scaled utilizing one or more scaling factors including, but not limited to, uniform scaling, non-uniform scaling, and the like. In one instance, scaling can be performed utilizing percentages, aspect ratios, and the like. The preview can be configured to be presented with one or more colors utilizing color element associated with setting 322. In one instance, the color of a border around the perimeter of the preview can be user configurable. For example, a border can be presented around the preview to indicate a content source. Decoration element of setting 322 can permit specialized customization of the preview. In one instance, image graphics can be associated with the preview to indicate preview rendering progress, dynamic content availability, and the like.

Setting 324 can comprise of one or more user configurable elements for controlling the presentation of the preview. Elements can determine when a preview is presented during a user interaction with an entity associated with dynamic content (e.g., URL) including, on mouseover events, responsive to user selection. The on mouseover element of setting 324 can trigger dynamic content to be fetched and presented within the preview. In one instance, Asynchronous Javascript and Extensible Markup Language (AJAX) technology can facilitate mouseover presentation of the preview. For example, when a user hovers over a URL, the dynamic content associated with the URL can be presented within a real-time preview. The selection element of setting 324 can cause entities to be responsive to user selection events including, single selection, group selection, and the like. For example, a user selecting a group of web components can be presented with a preview for each selected web component. The drag and drop element of setting 324 can permit a preview of dynamic content to be presented when the entity associated with the dynamic content is moved into a preview pane. For example, when a widget is dragged and dropped into an aggregated or portal page, a preview of the widget can be presented within the page.

Drawings illustrated herein are for illustrative purposes only and should not be construed to limit the invention in any regard. Dialog 310 can include one or more user input elements including, but not limited to, check boxes, radio, sliders, and the like. In one instance, settings 320-324 can be presented within a context menu of a real-time preview. In one instance, settings 320-324 can be content provider established, permitting content provider to customize delivery of dynamic content preview. In the instance, settings 320-324 can customize previews to fit content styles, schemes, and the like. For example, a content provider can utilize settings 320-324 to control the appearance of previews to conform to a Web site design scheme and/or layout.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for previewing dynamically generated content comprising:
   identifying a dynamically generated web content associated with a content provider, wherein the dynamically generated web content is a portion of markup content which automatically changes over time and is user-interactive, wherein the dynamically generated web content is uniform resource identifier (URI) addressable content;
   receiving the dynamically generated web content from the content provider; and
   presenting in real-time a preview of the dynamically generated web content within a markup renderable canvas of an interface, wherein the preview is uniformly scaled, wherein the dynamically generated web content within the preview is not a scaled rendering of an existing static image object, is non-interactive, and is unmodified by the receiving of the dynamically generated web content and the presenting of the preview.

2. The method of claim 1, wherein the dynamically generated web content comprises at least one of a portlet, a widget, a multimedia entity, a script artifact, and a Software-as-a-service (SaaS) entity.

3. The method of claim 1, wherein the preview of the dynamically generated web content is embedded within a markup container element, wherein the markup container element is a <DIV> tag, wherein the <DIV> tag content Editable attribute is set to false, wherein the markup container element is associated with at least one user control element that manages the preview, wherein the element provides at least one zoom functionality, show/hide functionality, and move functionality.

4. The method of claim 1, further comprising:
   generating a preview index for the dynamically generated web content, wherein the preview index is not a scaled rendering of existing static image objects; and
   enabling a user to select at least preview from the preview index.

5. The method of claim 1, further comprising: simultaneously presenting multiple different dynamically generated web content within the markup renderable canvas, wherein the multiple different dynamically generated web content comprises at least one of dynamically generated web content from different parts of a single website and dynamically generated web content from different multiple content servers.

6. The method of claim 1, wherein the presenting of a real-time preview of dynamically generated web content is triggered from user input, wherein the user input is at least one of a mouseover and a selective action.

7. The method of claim 1, wherein the method is implemented within at least one of a Web 2.0 environment and a Software-as-a-Service environment.

8. The method of claim 1, wherein the interface is a Web browser interface.

9. The method of claim 1, wherein selection of the preview navigates to the URI associated with the dynamically generated web content comprising the preview.

10. A system for previewing dynamically generated web content comprising:
   a processor;
   a volatile memory;
   a bus connecting said processor, a non-volatile memory, and the volatile memory to one another, wherein the volatile memory comprises computer usable program code execute-able by said processor, said computer usable program code comprising:
   a rendering engine configured to:
      identify a dynamically generated web content associated with a content provider, wherein the dynamically generated web content is a portion of markup content which automatically changes over time and is user-interactive, wherein the dynamically generated web content is uniform resource identifier (URI) addressable content;

generate a preview index for the dynamically generated web content, wherein the preview index is not a scaled rendering of existing static image objects;

receive the dynamically generated web content from the content provider based on the preview index; and render a preview of dynamically generated web content presented in real-time within a markup renderable canvas of a browser, wherein the preview comprises of markup identical to the markup of the dynamically generated web content, wherein the preview is scaled by a factor of X, wherein the preview is a non-image, wherein the markup elements within the preview are unable to receive user input.

11. The system of claim 10, wherein the preview is rendered in a manner visually distinctive from the dynamically generated web content, wherein a border presented around the preview identifies a content provider from a plurality of content providers, wherein image graphics are associated with the preview, wherein the image graphics indicate progress of the rendering process of the preview.

12. The system of claim 10, wherein the preview is markup associated with at least one of a Web 2.0 technology and a Software-as-a-Service environment.

13. The system of claim 10, wherein the preview is embedded proximate to a hyperlink associated with the dynamically generated web content, wherein the hyperlink is the URI of the dynamically generated web content.

14. The system of claim 10, wherein the preview is presented within a Cascading Style Sheet (CSS) layer.

15. The system of claim 10, wherein the preview is presented within a search result.

16. The system of claim 10, wherein the preview is associated with a security setting, wherein the security setting disables presentation within a dynamically generated web content associated with the preview.

17. The system of claim 10, wherein the rendering engine is a plug-in component of a Web browser.

18. The system of claim 10, wherein the preview is associated with a tool-tip, wherein the tool-tip is a textual description of the preview.

19. An apparatus including an interface for configuring a preview comprising:

display hardware within which an interface window is displayed;

a tangible memory storing at least one computer program product;

a processor operable to execute the computer program product to:

cause a rendering engine to generate a preview index for a dynamically generated web content associated with a content provider, wherein the preview index is not a scaled rendering of existing static image objects;

receive the dynamically generated web content from the content provider based on the preview index;

cause the interface window to be displayed by the display hardware; and provide the interface window for configuring a preview of a dynamically generated web content within a markup renderable canvas of a browser, wherein the preview is presented in real-time within the canvas of a browser, wherein the preview comprises of markup identical to the markup of the dynamically generated web content, wherein the preview is scaled by a factor of X, wherein the preview is a non-image, wherein the markup elements within the preview are unable to receive user input; and enable a user to select a preview from the preview index.

20. The apparatus of claim 19, wherein the interface window is associated with at least one of a position setting and a presentation setting.

* * * * *